Nov. 20, 1962     C. H. WHITMORE     3,064,821
APPARATUS FOR DRAINING COOLING LIQUID FROM CUTTING CHIPS
Filed Sept. 13, 1960     2 Sheets-Sheet 1
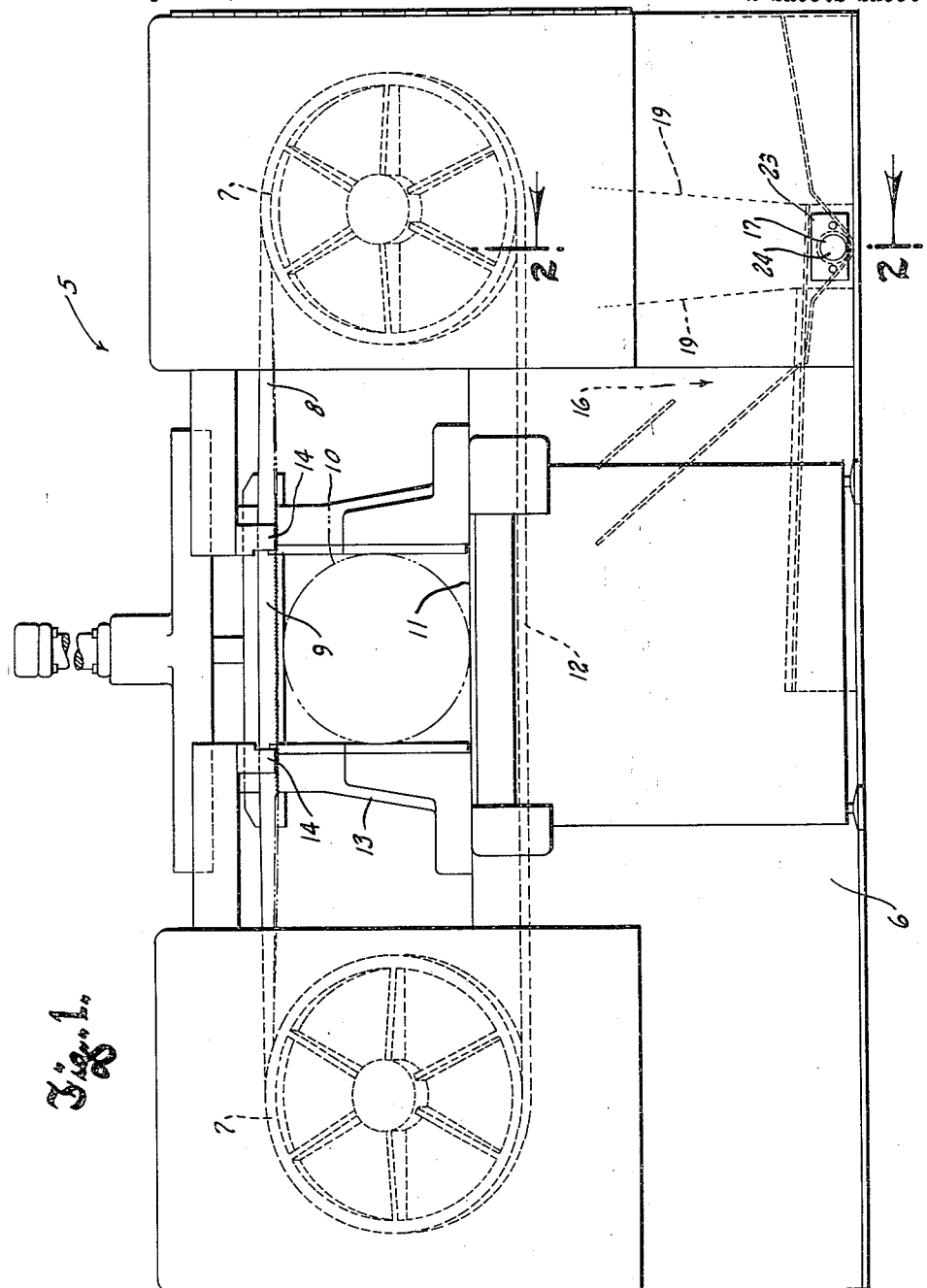
Inventor
Charles H. Whitmore

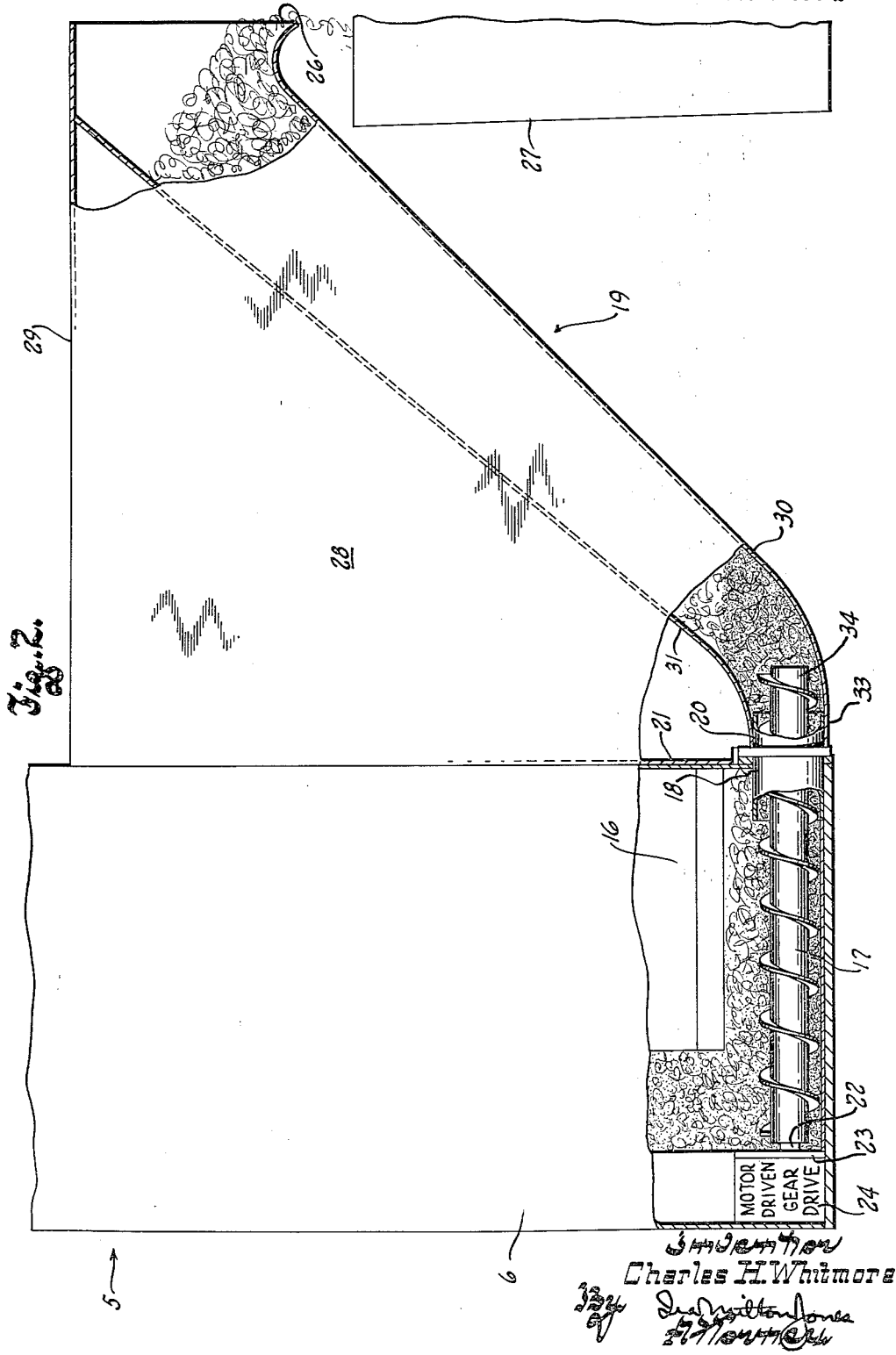

United States Patent Office 3,064,821
Patented Nov. 20, 1962

3,064,821
APPARATUS FOR DRAINING COOLING LIQUID FROM CUTTING CHIPS
Charles H. Whitmore, Minneapolis, Minn., assignor to Continental Machines, Inc., Savage, Minn., a corporation of Minnesota
Filed Sept. 13, 1960, Ser. No. 55,793
2 Claims. (Cl. 210—523)

This invention relates to metal cutting machines in which fluid coolant is used to cool and lubricate the cutting element of the machine, and the invention refers more particularly to means in such a machine for draining cooling liquid from cutting chips, so that the liquid can be re-used and the chips can be delivered out of the machine in substantially dry condition.

An example of a metal cutting machine in which cooling fluid is used is the cut-off saw disclosed in Patent No. 2,898,669 to R. L. Crane, which is a band saw machine intended for use with large work pieces. In the machine of that patent, cooling liquid is copiously applied to the saw band as it enters the work zone, and the liquid, mixed with chips cut from the work, falls into a receptacle in the base of the machine. The chips are moved from the receptacle into and upwardly through a chip elevator at the rear of the machine, in which liquid drains off of the chips while they are raised up to be dropped into a waste can or the like; and the cooling liquid flows back into the receptacle, from which it is ultimately pumped back to the saw band.

The chip elevator in the machine of said Crane patent comprises a pair of conveyor chains that extend through an upwardly inclined discharge chute and which are provided with flights upon which the chips are carried from the inlet to the outlet of the chute.

While generally satisfactory, such a chip elevator left much to be desired in certain respects. A substantial amount of power was required to drive its chain conveyor, and the flights on the conveyor tended to interfere with chip drainage so that the chips were still soaked with a certain amount of coolant when they were expelled from the elevator. Moreover, the conveyor chains and the sprockets around which they were trained were constantly subjected to the abrasive action of the chips, and they were liable to be damaged by the presence of unusually large pieces of metal mixed with the chips.

By contrast, it is an object of this invention to provide apparatus for automatically draining cooling liquid off of chips produced by a metal cutting machine, and expelling the chips from the machine, which apparatus is simple, rugged and inexpensive but nevertheless expels chips from the machine in substantially dry condition, permitting cooling liquid used by the machine to be almost completely reclaimed.

Another object of this invention resides in the provision of chip drainage and removal apparatus for a metal cutting machine of the type that uses cooling liquid, which apparatus has no chain conveyor to absorb power and interfere with chip drainage, and is therefore low in first cost, very easy to maintain, and very efficient in operation.

A further object of this invention resides in the provision of chip drainage and removal apparatus for a metal cutting machine, comprising an upwardly inclined chute or passage through which chips are slowly upwardly propelled without any tendency to be compacted, despite the fact that the apparatus includes no conveyor or similar propelling means extending through the passage to positively move chips therethrough, and in which they drain for a substantial period of time.

Another object of this invention is to provide a chip drainage and removal apparatus for a metal cutting machine which consumes very little power in moving chips upwardly along the discharge chute or passage just referred to, and which provides for expulsion of substantially dry chips from said chute or passage because the absence of compaction of the chips permits fluid to readily drain off of them and the long period during which the chips are in the chute or passage insures that such drainage will be quite complete.

It is also an object of this invention to provide apparatus of the character described which is not likely to be damaged or adversely affected by large pieces of steel, nuts, bolts and the like that may become mixed with the chips.

With the above and other objects in view which will appear as the description proceeds, this invention resides in the novel construction, combination and arrangement of parts substantially as hereinafter described and more particularly defined by the appended claims, it being understood that such changes in the present embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a front view of a band saw machine equipped with the chip drainage and removal apparatus of this invention; and FIGURE 2 is a fragmentary side view on an enlarged scale of the machine shown in FIGURE 1, portions being broken away and shown in section along the plane of the line 2—2 in FIGURE 1.

Referring now more particularly to the accompanying drawings, the numeral 5 designates generally a metal cutting machine incorporating the apparatus of this invention and which, for purposes of illustration, is shown as a band-type cut-off saw generally similar to that disclosed in the aforesaid Patent No. 2,898,669. It will be understood that the apparatus of this invention is also applicable to other types of metal cutting machines such as lathes, milling machines and the like in which cooling liquid is applied to the cutting element of the machine in the zone where it engages a work piece, and wherein the cooling liquid is separated from the chips with which it becomes mixed and is returned to the cutting zone for re-use.

In this instance the band sawing machine 5 comprises a base 6 upon which a pair of band wheels 7 are mounted for rotation on laterally spaced parallel axes and for up and down motion in unison. Trained around the wheels is a saw band 8, the upper horizontal stretch 9 of which defines a work zone. A piece of material 10 to be cut by the saw is supported on a table 11 that forms the top of the base 6, between the upper and lower horizontal stretches 9 and 12 of the saw band, and is steadied by a work holder 13 mounted on the base. Saw guides 14 twist the band as it enters and leaves the work zone so that its side faces are disposed in a vertical plane in said zone, and hence as the band wheels move downwardly the cutting stretch 9 of the band can make a cut straight downwardly through the piece of work 10.

It will be understood that liquid coolant is copiously applied to the band just as it enters the work zone, as by means of the apparatus disclosed in United States Letters Patent No. 2,815,562. To prevent the coolant and chips from running down onto the lower horizontal stretch 12 of the saw band, the axes of the band wheels 7 are somewhat inclined out of horizontal so that the lower stretch of the band is disposed a distance to one side of the plane of the cutting stretch. Chips and coolant fluid can therefore fall directly down through suitable slots or apertures in the work supporting table 11 and into a receptacle or hopper 16 in the base of the machine, where the cooling fluid is recovered and pumped back up to the cutting zone.

Extending across the bottom of the hopper 16, disposed on a substantially horizontal axis, is a worm or screw conveyor 17 which is rotatable in the direction to move mixed chips and cooling liquid toward a hopper outlet 18 at the rear of the machine, and thus toward a chute-like chip drainage duct or passage 19 that has its inlet communicated with the hopper outlet and which extends rearwardly and obliquely upwardly from the hopper outlet. Communication between the hopper and the chip drainage duct is through a short tube 20 which extends through the rear wall 21 of the machine base and in which the rear end portion of the worm 17 is rotatably received. At its front end the worm has a forwardly projecting coaxial shaft 22 which is journaled in a bearing 23 fixed in the base of the machine. A conventional electric motor driven gear reduction drive unit 24 or the like is connected to the shaft 22 to drive the worm in the direction to continually feed the chips into the lower inlet end of the chip drainage and delivery duct 19 which is in fore-and-aft alignment with the worm 17.

Because of the upward inclination of the duct 19, its outlet 26 is elevated a substantial distance above the worm 17 to allow a suitable waste can or other receptacle 27 to be placed beneath the duct outlet for drained chips to fall into.

The side walls 28 of the drainage duct may be formed as substantially triangular plates having their front edges secured as by welding, to the rear wall 21 of the machine base. The plates 28 are disposed substantially upright, but preferably are inclined slightly from the vertical so as to diverge upwardly from one another. Their upper edges 29 can extend straight back from the rear base wall 21, and their lower edges are of course inclined upwardly and are spanned by the bottom wall 30 of the duct. The angle at which the bottom wall of the duct is inclined to the horizontal can be in the neighborhood of 45°.

While it may not be needed in all cases, the duct is desirably provided with a top wall 31 which spans the side plates 28 and is preferably disposed in upwardly divergent relation to the bottom wall. Constructed as described, the chip drainage duct diverges from its inlet to its outlet, both in the fore-and-aft dimension and from side-to-side, so that it presents a progressively increasing cross section to chips traveling from its inlet to its outlet.

The lower end portions of the top and bottom walls of the duct are curved so that the inlet end portion 33 of the duct extends substantially horizontally for a short distance rearwardly from its point of communication with the hopper 16 and thence curves smoothly into the upward inclination which characterizes the major portion of the length of the duct. The extreme rear end portion 34 of the worm preferably projects beyond the rear end of the tube 20 and into the horizontally extending lower portion of the duct to insure that chips from the hopper will be fed into the duct and started on their way up the same.

Such feeding of chips into the bottom of the duct of course causes chips in the duct to rise up along it, in response to the pressure from below, until they eventually emerge from the duct outlet 26 to drop into the waiting receptacle 27. Urging the chips up the duct from below in this manner naturally effects some compacting of the chips, but this can be minimized by forming the chute with upwardly divergent walls as described. Such divergence of the chute walls has the further advantage of reducing the power required to drive the worm and assures a smooth steady flow of chips up the duct.

Because the chips move up the duct quite slowly, substantially all of the cooling liquid with which they are soaked has time to drain off of them and flow down along the inclined bottom wall 30 of the duct, back into the hopper 16 for further use. It has been found that chips emerge from the duct outlet in an almost completely dry state, indicating that the apparatus effects substantially full recovery of cooling liquid.

From the foregoing description taken together with the accompanying drawings, it will be apparent that this invention provides simple, inexpensive and dependable apparatus for draining liquid coolant off of chips produced by a metal cutting machine, to permit re-use of the coolant, and expels chips from the machine in substantially dry condition. It will also be apparent that the apparatus of this invention is not likely to be blocked or jammed either by compacted masses of chips or by large pieces of metal mixed with the chips, since any material that can be conveyed into the drainage duct by the worm will thereafter move easily through the duct to its outlet.

What is claimed as my invention is:

1. In a metal cutting machine of the type in which cooling fluid fed to the cutting zone of the machine is collected along with chips from metal being cut, means for draining cooling fluid off of the chips to permit re-use of the fluid, said means comprising: a collecting hopper beneath the cutting zone of the machine in which chips from the cutting zone are received, mixed with cooling fluid; a chip drainage and delivery duct having its inlet adjacent to the bottom of the hopper and extending obliquely upwardly therefrom so that its outlet is spaced a substantial distance above its inlet; a tube connecting the inlet of the duct with the hopper and providing the only communication therebetween; and a screw conveyor in the hopper with an end portion thereof in said tube to feed chips from the hopper into said tube, said screw conveyor keeping the tube full of chips and thereby continually forcing the same from the tube and into the inlet of said chip drainage and delivery duct, to propel chips upwardly through the duct; opposite walls of said chip drainage and delivery duct diverging from the inlet of the duct to the outlet thereof whereby the duct has an expanding cross section from its inlet to its outlet so as not to add to the compaction of the chips resulting from the weight thereof as they are forced upwardly through the duct by the pressure of chips fed into the inlet of the duct, the upward inclination of the drainage and delivery duct providing for drainage of fluid off of chips in the duct as they are moved upwardly toward its outlet so that such chips are substantially dry when they emerge from the duct outlet.

2. In a metal cutting machine of the type in which cooling fluid fed to the cutting zone of the machine is collected along with chips from metal being cut, means for draining cooling fluid off of the chips to permit re-use of the fluid, said means comprising: a collecting hopper in the bottom of the machine in which chips are received, mixed with cooling fluid; a chip drainage and delivery duct having its inlet in open communication with the bottom portion of the hopper, and comprising opposite flat side walls and bottom and top walls spanning the distance between and secured to said side walls, the bottom wall sloping upwardly from the inlet of the duct and the top wall also sloping upwardly but at a steeper angle so that the bottom and top walls diverge from the inlet to the outlet of the duct; a screw conveyor in the bottom of the hopper with its delivery end contiguous to the inlet of the chip drainage and delivery duct to deliver chips to the inlet of the duct, and by continuously feeding chips into said duct, propel the chips upwardly through the duct, the divergence of the top and bottom walls of the duct affording an expanding cross section for the duct from its inlet to its outlet so that the duct does not constrain the upward advance of chips towards its outlet and hence does not add to the compaction of the chips resulting from the weight thereof as they are forced upward through the duct by the pressure of the chips fed into the inlet of the duct, the upward inclination of the duct providing for drainage of fluid off of the chips as they are moved upwardly towards its outlet so that such chips are substantially dry when they emerge from the outlet of the duct.

References Cited in the file of this patent

UNITED STATES PATENTS

| | | |
|---|---|---|
| 1,570,031 | Baldner | Jan. 19, 1926 |
| 1,753,050 | Hughes | Apr. 1, 1930 |
| 1,905,342 | Burton | Apr. 25, 1933 |
| 2,717,697 | Viggers | Sept. 13, 1955 |
| 2,868,384 | Puddington | Jan. 13, 1959 |
| 2,898,669 | Crane et al. | Aug. 11, 1959 |

FOREIGN PATENTS

| | | |
|---|---|---|
| 62,069 | Denmark | Nov. 22, 1941 |